US010625284B1

(12) United States Patent
Gutekunst et al.

(10) Patent No.: US 10,625,284 B1
(45) Date of Patent: Apr. 21, 2020

(54) MODULAR FRAME FOR A BACKPACK SPRAYER

(71) Applicant: Chapin Manufacturing, Inc., Batavia, NY (US)

(72) Inventors: Greg Gutekunst, East Aurora, NY (US); David Dubiel, N. Chili, NY (US)

(73) Assignee: Chapin Manufacturing, Inc., Batavia, NY (US)

( * ) Notice: Subject to any disclaimer, the term of this patent is extended or adjusted under 35 U.S.C. 154(b) by 0 days.

(21) Appl. No.: 16/351,882

(22) Filed: Mar. 13, 2019

(51) Int. Cl.
| B05B 9/08 | (2006.01) |
| A01G 25/14 | (2006.01) |
| A01M 21/04 | (2006.01) |
| A01M 7/00 | (2006.01) |
| A01C 23/00 | (2006.01) |

(52) U.S. Cl.
CPC ............ *B05B 9/085* (2013.01); *A01C 23/008* (2013.01); *A01G 25/145* (2013.01); *A01M 7/0085* (2013.01); *A01M 21/043* (2013.01)

(58) Field of Classification Search
CPC ... B05B 7/2475; B05B 9/0888; B05B 7/1427; B05B 9/0877; B05B 7/1413; B05B 9/08; A45F 3/08; A45F 2003/045; A01M 7/0017
USPC ...................................................... 224/148.7
See application file for complete search history.

(56) References Cited

U.S. PATENT DOCUMENTS

| 3,199,785 | A | | 8/1965 | Schmierer | |
| 3,586,238 | A | * | 6/1971 | Schmierer | A01M 11/00 |
| | | | | | 239/153 |
| 4,690,331 | A | * | 9/1987 | Luchsinger | B05B 9/0877 |
| | | | | | 239/333 |
| 5,636,791 | A | * | 6/1997 | Leer | B05B 9/0877 |
| | | | | | 239/142 |
| 5,752,661 | A | | 5/1998 | Lewis | |
| 6,729,558 | B1 | | 5/2004 | Seenauth | |
| 7,007,826 | B2 | | 3/2006 | Shapanus et al. | |
| 7,854,396 | B2 | * | 12/2010 | Wu | A01G 25/09 |
| | | | | | 239/152 |
| 10,357,099 | B2 | * | 7/2019 | Riehmann | A45F 3/14 |
| 10,456,797 | B2 | * | 10/2019 | Wiedmann | B05B 7/0081 |
| 10,562,052 | B2 | * | 2/2020 | Fontaine | B05B 9/0861 |

FOREIGN PATENT DOCUMENTS

| DE | 102007023409 | 11/2008 |
| JP | 2016208888 | 12/2016 |

* cited by examiner

*Primary Examiner* — Adam J Waggenspack
(74) *Attorney, Agent, or Firm* — Woods Oviatt Gilman LLP; Katherine H. McGuire, Esq.

(57) ABSTRACT

A modular frame for a backpack sprayer system includes a frame plate having a front surface, a back surface and first and second side edges. A first receiving channel is located along the first side edge and a second receiving channel is located along the second side edge. A support member has a first arm which is received within the first receiving channel and a second arm which is received within the second receiving channel. A stand portion extends at an angle relative to the first and second arms. A mounting member is coupled to the front surface of the frame plate and mounts a tank and a pump unit thereon. The mounting member includes opposing left and right sides, a planar top face and a front face including a concave portion to receive at least a portion of one or both of the tank and the pump unit.

6 Claims, 8 Drawing Sheets

MODULAR FRAME FOR A BACKPACK SPRAYER

FIELD OF THE INVENTION

The present invention generally relates to sprayers, and more particularly to a backpack style sprayer, and still more particularly to a modular frame configured for use with a variety of backpack style sprayers, including single-tank or multi-tank sprayers, manually actuated or electrically driven pump sprayers, and/or/or internal or external pump sprayers.

BACKGROUND OF THE INVENTION

Sprayers, such as backpack sprayers are used across an array of applications, including farms, golf courses and residential properties, to apply water or other liquids, such as fertilizers or pesticides including herbicides, insecticides and the like. As the name implies, backpack sprayers are designed to be worn by the user, such as through securing a tank of the sprayer against the user's back via one or more shoulder straps. A handheld spray wand is fluidly coupled to the tank and is manually actuated, such as through a trigger, to dispense fluid from the tank through the spray wand. To pressurize the fluid for delivery to the wand, backpack sprayers include a pump and may be configured as battery powered pump sprayers or manually actuated pump sprayers.

In use, a backpack sprayer tank is filled with a selected fluid composition that is to be applied. By way of example, pesticide solutions may be anywhere from about 1% to about 10% active chemical in water. In one scenario, a user may spray a diluted herbicide solution, such as to target thistle. However, to apply a second pesticide solution, such as a diluted insecticide to fruit trees, the user will first have to completely empty the tank of the herbicide solution before rinsing the tank of any residual chemicals and finally refilling the tank with the desired insecticide solution. As may be readily apparent from the above, there are numerous drawbacks to such systems. For example and without limitation, such drawbacks may include waste of chemicals, the need for controlled disposal of unused chemicals, the time consuming need to thoroughly clean the tank between applications and the potential for cross-contamination and application of unwanted chemicals after incomplete or unsuccessful cleaning of the tank.

To alleviate some of the above-referenced drawbacks of these backpack sprayers, systems have been developed which segregate the chemical portion from the water/diluent portion of the system. In such systems, the chemical may be stored in a smaller, separate tank than the large diluent/water tank. Metering devices may then add chemical to a flow of water prior to emission from the wand. In this manner, the chemical remains isolated from the water tank, thereby minimizing or avoiding possible contamination of the water source.

From the above discussion, it can be seen that there are a number of possible configurations for a backpack style sprayer. For instance, the sprayer may be a single tank sprayer or a two-tank sprayer having a diluent tank and concentrate tank. Additionally, the pump unit may be mounted outside or inside the main spray tank. Still further, the pump unit may be manually actuated or electrically powered. Electrically powered pump units can, for instance, be hard-wired with an electrical cord or include a battery powered mechanism. Typically, each of these various sprayer configurations would require a dedicated tank mounting and sprayer stand. As a result, backpack sprayer options may be limited as manufacturers minimize available configurations due to manufacturing inefficiencies and design and production costs.

Thus, there remains a need for a singular modular frame for a backpack sprayer that can be used to mount various spray tank and pump unit configurations. The present invention satisfies this as well as other needs.

SUMMARY OF THE INVENTION

In view of the above and in accordance with an aspect of the present invention, the present invention is generally directed to a modular frame for a backpack sprayer system including a frame plate having a front surface, a back surface and first and second side edges. A first receiving channel is located along the first side edge and a second receiving channel is located along the second side edge. A support member has a first arm which is received within the first receiving channel and a second arm which is received within the second receiving channel. A stand portion extends at an angle relative to the first and second arms. A mounting member is coupled to the front surface of the frame plate and mounts a tank and a pump unit thereon. The mounting member includes opposing left and right sides, a planar top face and a front face including a concave portion to receive at least a portion of one or both of the tank and the pump unit.

In a further aspect of the present invention, the front face is configured to secure a mounting bracket thereto so as to secure the tank and the pump unit to the mounting member. Still further, the frame plate and the mounting member may be a unitary construction formed by injection molding. In another aspect, the front surface of the frame plate may include a tank projection above the top face of the mounting member, wherein the tank projection is configured to be matingly received within an indentation formed on a back surface of the tank. Additionally, one or both of the first side and the second side of the mounting member may include a respective aperture configured to receive a pump actuation rod therethrough.

Additional objects, advantages and novel aspects of the present invention will be set forth in part in the description which follows, and will in part become apparent to those in the practice of the invention, when considered with the attached figures.

DETAILED DESCRIPTION OF THE PREFERRED EMBODIMENTS

Figure 1:
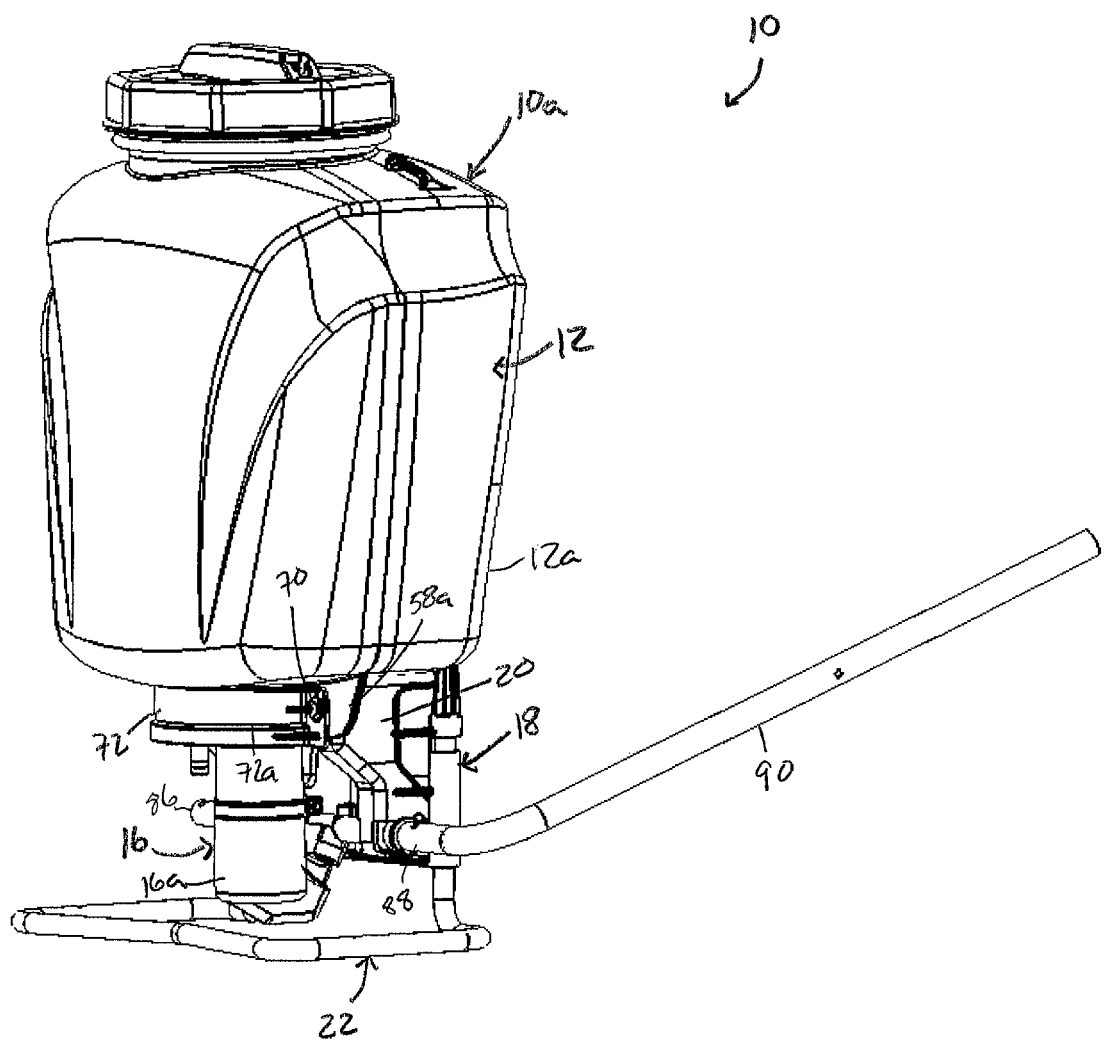
FIG. 1 is a front perspective environmental view of a sprayer system with a modular frame for a backpack sprayer in accordance with an aspect of the present invention.
Figure 2:
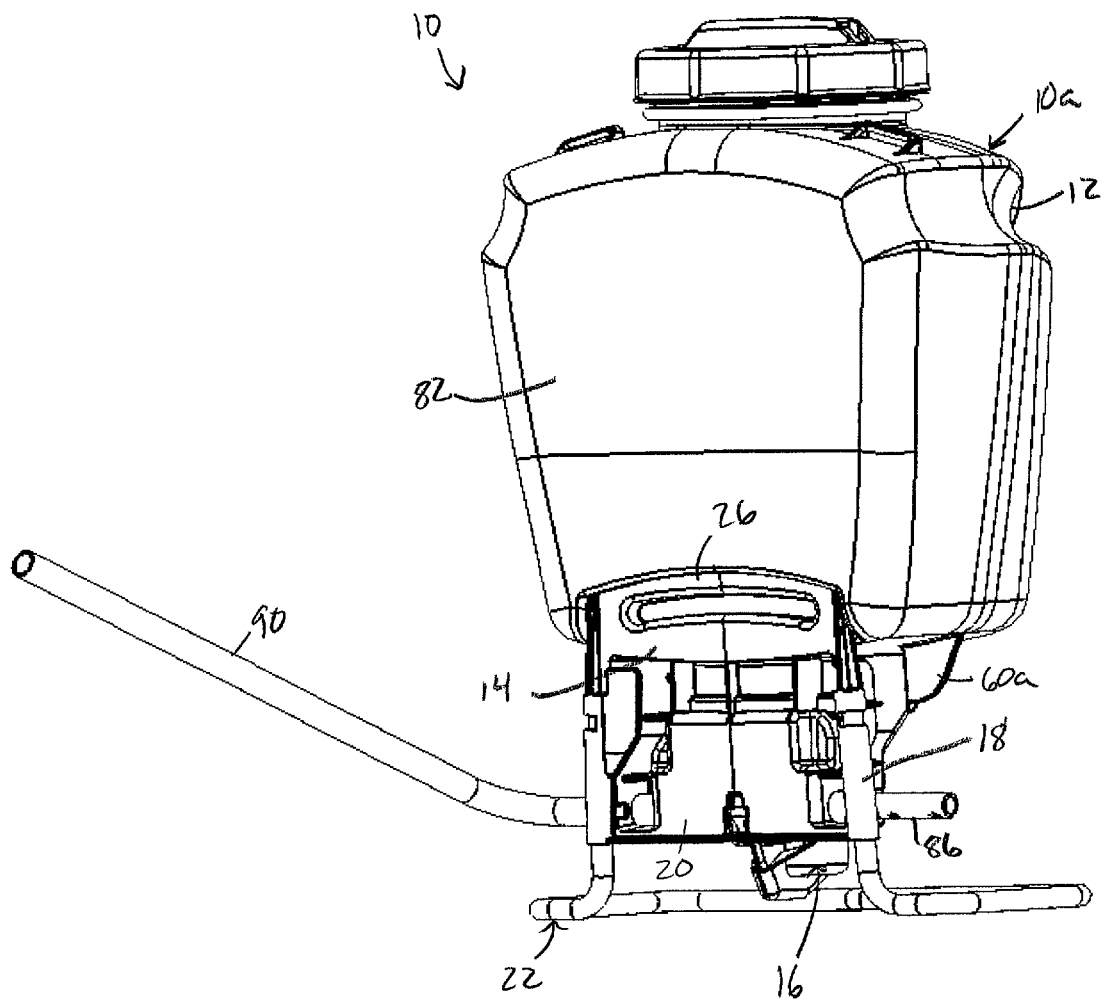
FIG. 2 is a rear perspective environmental view of the sprayer system shown in FIG. 1.

Referring now to FIGS. 1-5, in accordance with an aspect of the present invention, an exemplary sprayer system 10a may generally comprise a first tank 12 and pump unit 16 mounted onto an embodiment of a modular backpack frame 18 in accordance with the present invention. Rear wall 14 of backpack frame 18 (and rear wall 82 of first tank 12) may each have a curved profile so as to more ergonomically rest against a user's back during use. In accordance with an aspect of the present invention, first tank 12 may house a pressure vessel (not shown) therein, with the first tank 12 and pressure vessel fluidly coupled to pump unit 16.

Figure 3:
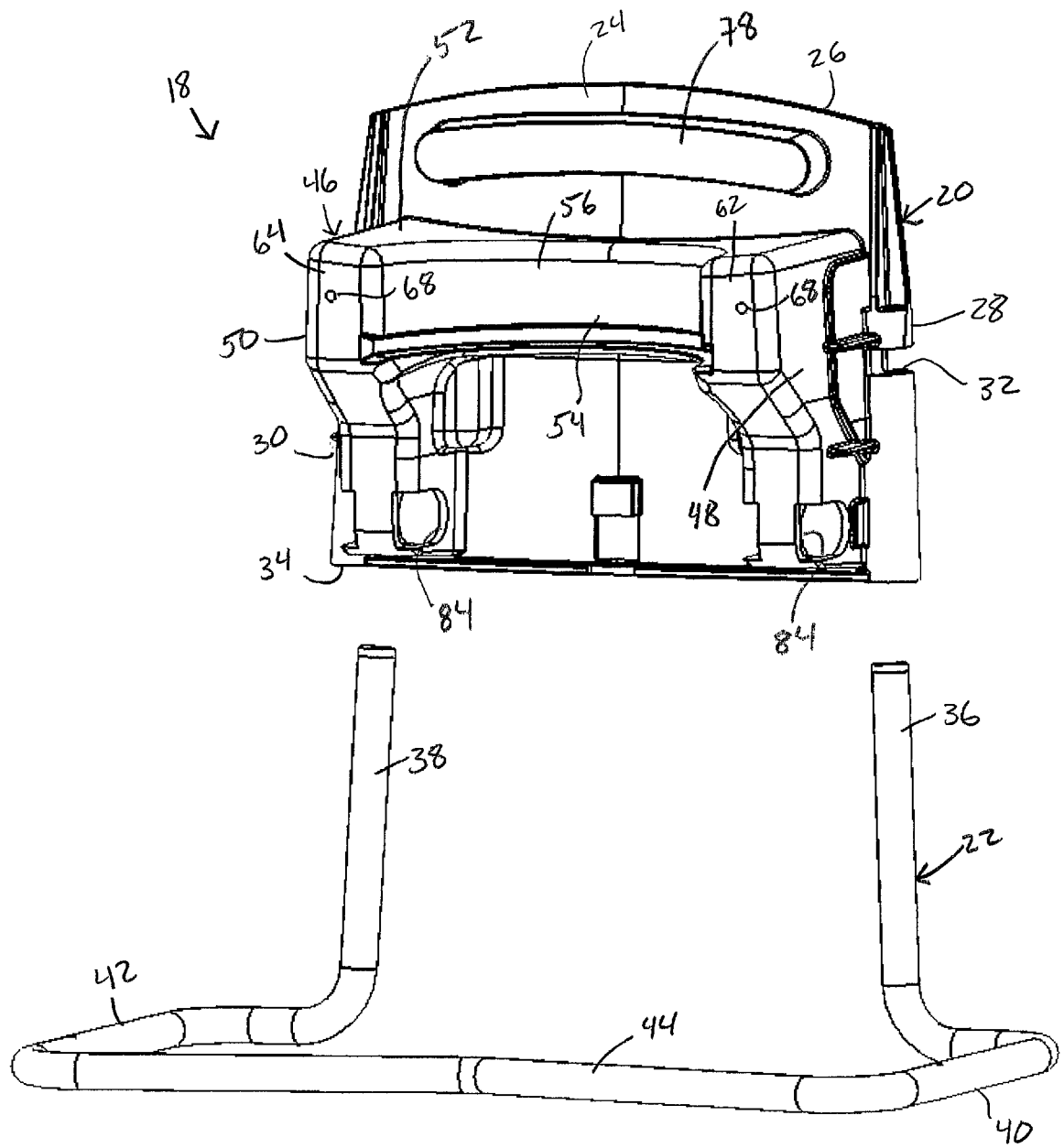
FIG. 3 is an exploded view of an embodiment of a modular frame for a backpack sprayer in accordance with an aspect of the present invention.

With particular reference to FIG. 3, modular backpack frame 18 is generally comprised of a frame plate 20 and support member 22. Frame plate 20 includes a front surface 24, back surface 26 and opposing first and second side edges 28, 30. First edge 28 defines a first receiving channel 32 along at least a portion of first edge 28. Similarly, second edge 30 defines a second receiving channel 34 along at least a portion of second edge 30. Support member 22 includes first and second arms 36, 38. First arm 36 is configured to be slidingly received within first receiving channel 32, such as through a snug friction fit. Similarly second arm 38 is configured to be slidingly received within second receiving channel 34, such as through a snug friction fit. Additionally, or optionally, fasteners (not shown) may be used to secure first and second arms 36, 38 within their respective receiving channels 32, 34. First and second arms 36, 38 include a stand portion 40, 42 extending at an angle relative to first and second arms 36, 38 whereby stand portions 40, 42 may support frame plate 20 (and first tanks 12) in a generally upright, vertical position when exemplary sprayer system 10a is placed on a horizontal surface, such as a floor or the ground. An optional horizontal connecting bar 44 may be mounted to first and second arms 36, 38, and may provide additional support and rigidity to support member 22.

With continued reference to FIG. 3, modular backpack frame 18 may further include a mounting member 46 coupled to front surface 24 of frame plate 20. In accordance with an aspect of the present invention, mounting member 46 and frame plate 20 are manufactured as a unitary construction, such as and without limitation thereto, through injection molding. Mounting member 46 is configured to mount first tank 12 and pump unit 16 thereon. To that end, mounting member 46 generally comprises opposing left and right sides 48, 50, a planar top face 52 and a front face 54 including a concave portion 56 which is configured to receive at least a portion of one or both first and second tank 12, 14 and pump unit 16 therein (see e.g., FIG. 1).

Figure 4:
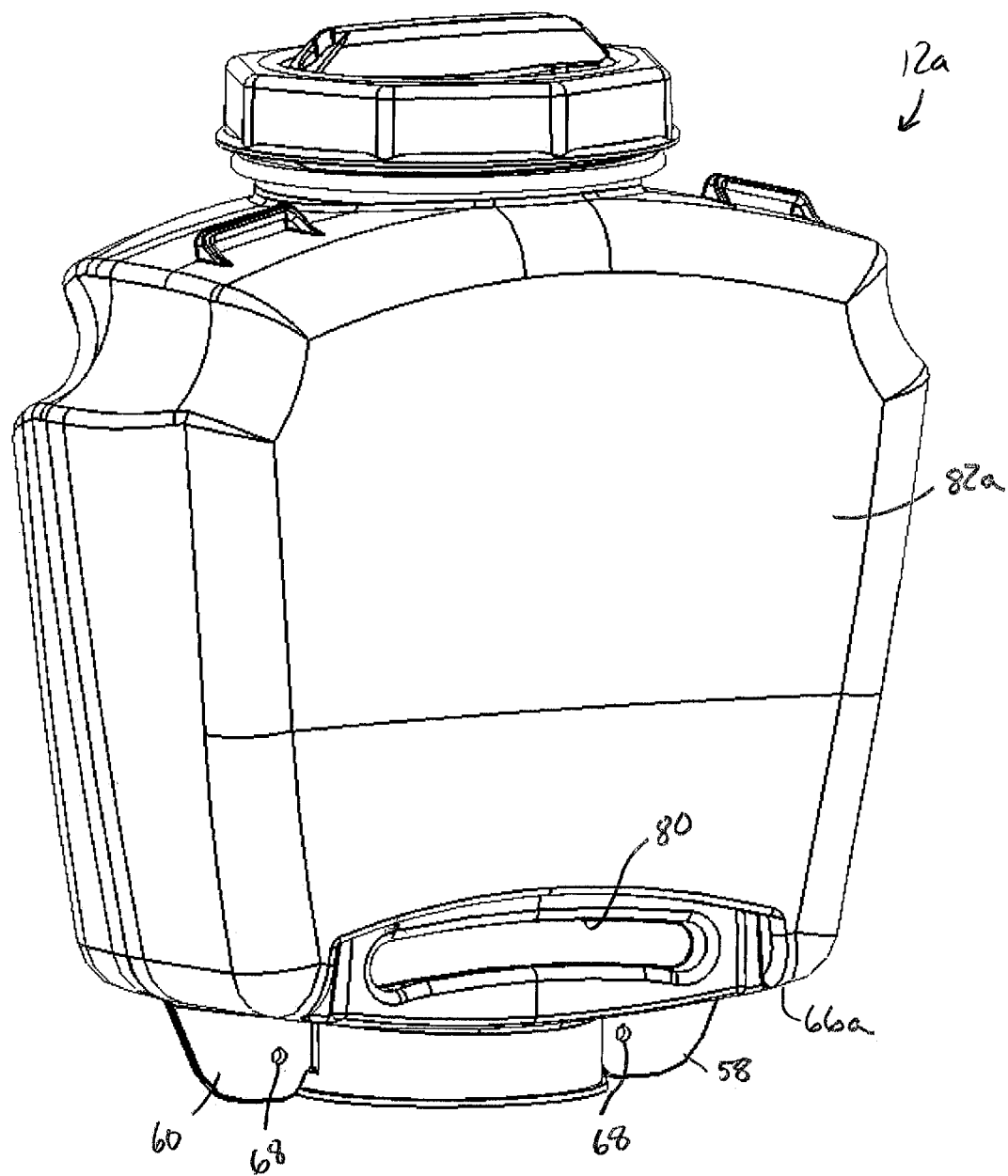
FIG. 4 is a rear perspective view of an exemplary spray tank suitable for use with the modular frame for a backpack sprayer shown in FIG. 3.
Figure 5:
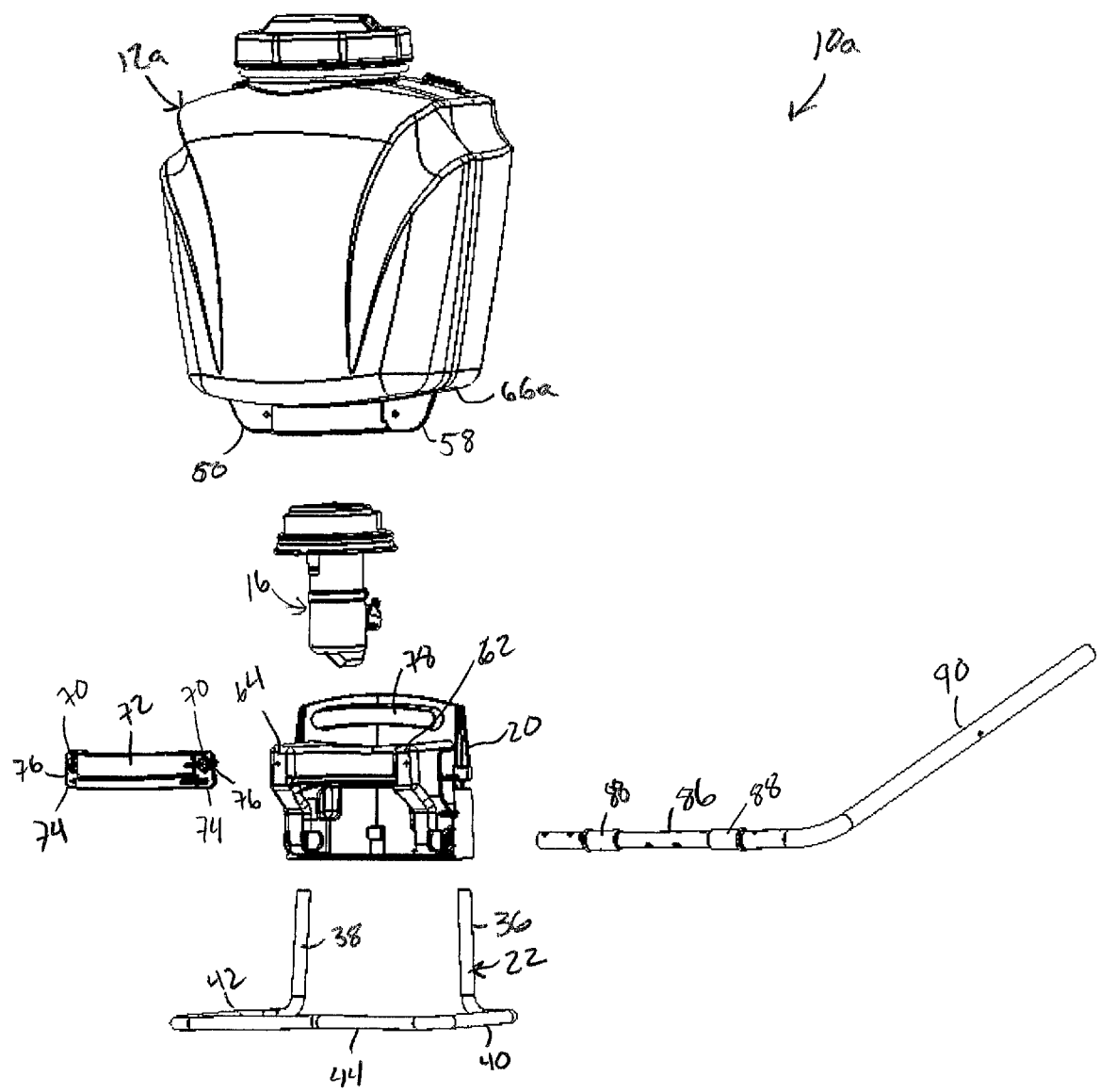
FIG. 5 is an exploded environmental view of the sprayer system shown in FIG. 1.

With particular reference to FIGS. 4 and 5, an exemplary first tank 12a may include a pair of opposing wings 58, 60 which are dimensioned to overlap planar portions 62, 64 of front face 54 when bottom surface 66a of first tank 12a is seated upon planar top face 52 of mounting member 46. Each of wings 58, 60 and planar portions 62, 64 may define a respective aperture 68 therein. A respective fastener 70 may threadably engage paired apertures 68 within wing 58/planar portion 62 and wing 60/planar portion 64 so as to secure first tank 12 to mounting member 46 (and frame plate 20). Additionally or alternatively, fasteners 70 may be coupled to a respective nut (not shown) so as to secure assembly first tank 12 to mounting member 46.

In a further aspect of the invention, first tank 12 may be integrally coupled to mounting member 46, such as via a weld, rivet or other non-threaded connection. In still another aspect of the present invention, exemplary sprayer system 10a may include a support bracket 72 having opposing tabs 74 which include a respective aperture 76 which is configured to align with apertures 68 in wings 58, 60 and planar portions 62, 64 when support bracket 72, first tank 12 and mounting member 46 are properly positioned for assembly. Fasteners 70 may then secure tabs 74, wings 58, 60 and planar portions 62, 64 as described above.

In still another aspect of the present invention, as shown in FIG. 3, front surface 24 of frame plate 20 may include an outwardly extending tank projection 78 located above planar top face 52 of mounting member 46. With additional reference to FIG. 6 tank projection 78 is configured to be matingly received within an indentation 80 formed on a back surface 82a of first tank 12a when bottom surface 66a of first tank 12a is seated upon planar top face 52 of mounting member 46 as described above. The mating of tank projection 78 with indentation 80 may assist in preventing unwanted shifting or displacement of tank 12a with respect to frame plate 20 during assembly and use. This mating may also assist in aligning apertures 68 (and option apertures 76) during assembly of exemplary sprayer system 10a.

In yet another aspect of the present invention, one or both of first side edge 48 and second side edge 50 of mounting member 46 may include one or more apertures 84 configured to receive a pump actuation rod 86 therethrough when sprayer system 10 is set up as a manually actuated pump sprayer (see e.g., FIG. 1). Pump actuation rod 86 may include bushings 88 to enable rotation of pump actuation rod upon movement of handle 90 to drive pump unit 16 without generating undue wear to apertures 84.

Turning now to non-limiting examples of sprayer systems configured for use with the modular backpack frame 18 of the present invention are shown in FIGS. 1-2, 6 and 7. As described above, sprayer system 10a shown in FIGS. 1 and 2 is configured as a single tank 12a unit (plus internal pressure vessel) having an external, manually actuated pump unit 16a. A pump actuation rod 86 including bushings 88 is received within apertures 84 of mounting member 46. An optional support bracket 72a is included to mount support bracket 72a and wings 58a, 60a to planar portions 62, 64 of front face 54 using fasteners 70 as described above.

Figure 6:
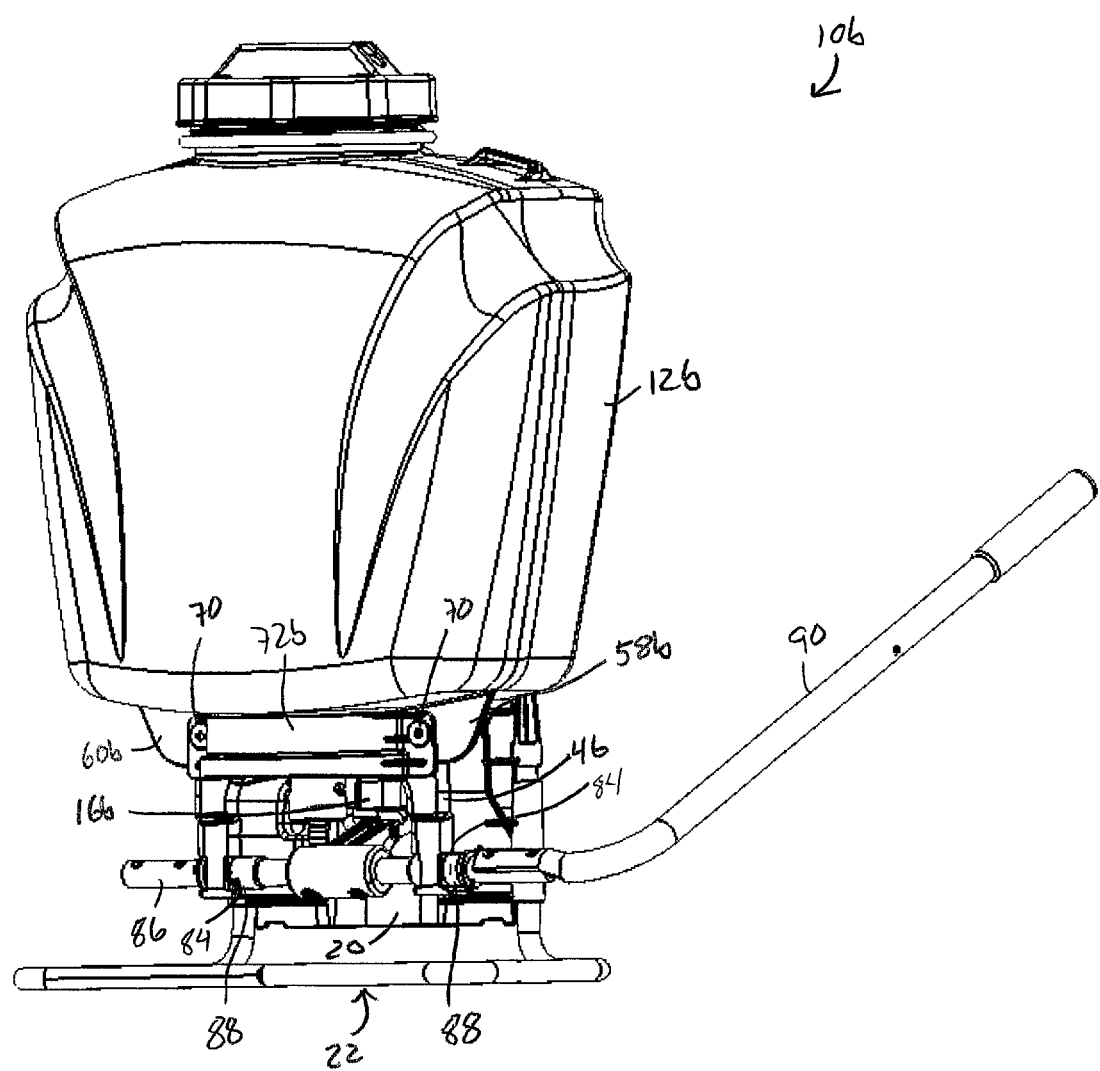
FIG. 6 is a front perspective environmental view of an alternative sprayer system using the modular frame for a backpack sprayer shown in FIG. 3.

With reference to FIG. 6, exemplary sprayer system 10b is configured as a single tank 12b unit (plus internal pressure vessel) having an internal, manually actuated pump unit 16b. A pump actuation rod 86 including bushings 88 is received within apertures 84 of mounting member 46. An optional support bracket 72b is included to mount support bracket 72b and wings 58b, 60b to planar portions 62, 64 of front face 54 using fasteners 70 as described above.

Figure 7:
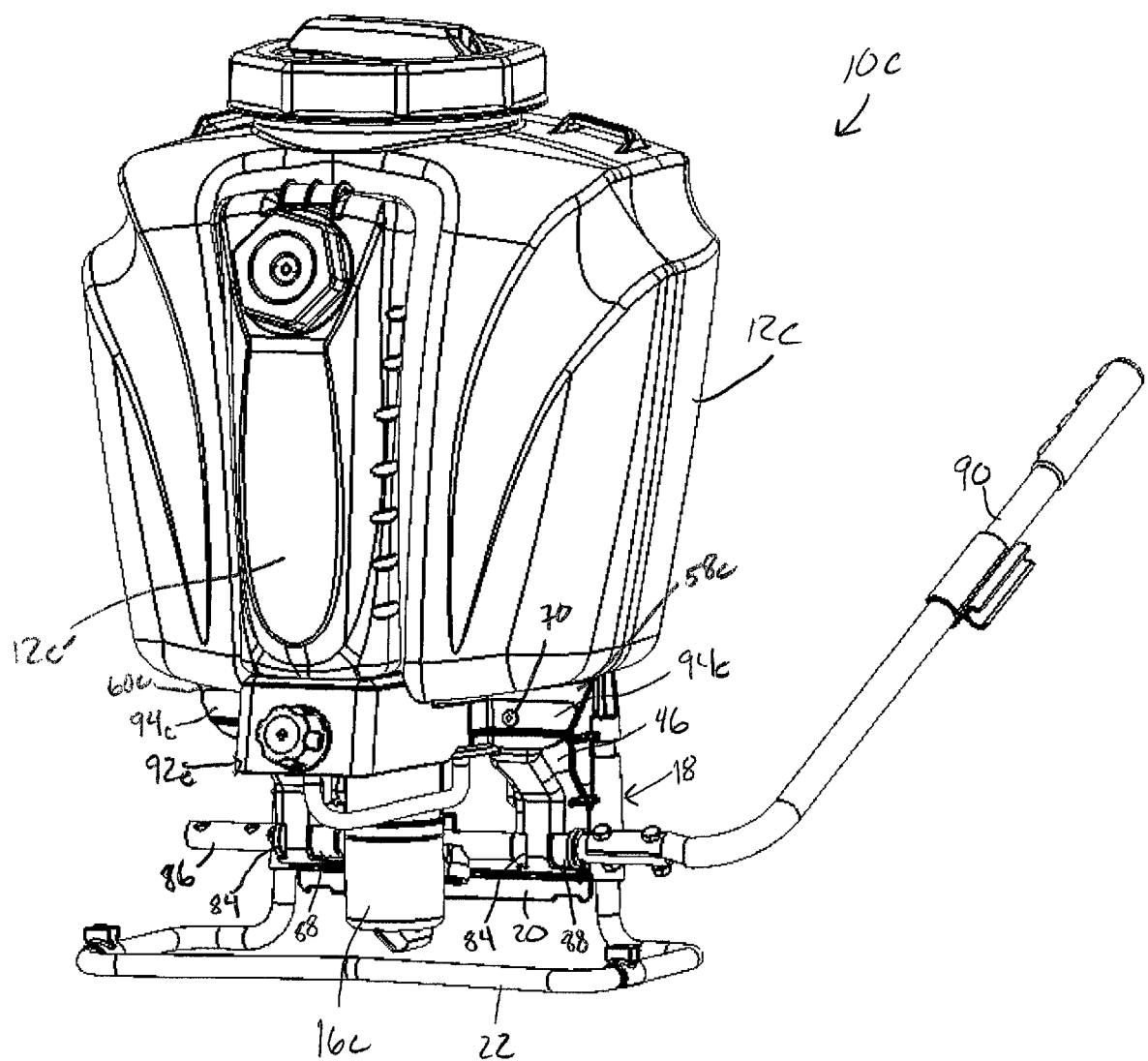
FIG. 7 is a front perspective environmental view of another alternative sprayer system using the modular frame for a backpack sprayer shown in FIG. 3.

Turning now to FIG. 7, exemplary sprayer system 10c is configured as a dual tank 12c, 12c' unit (plus internal pressure vessel) having an external, manually actuated pump unit 16c. A pump actuation rod 86 including bushings 88 is received within apertures 84 of mounting member 46. Replacing optional support bracket 72 is a flow control assembly 92 (such as a needle valve or rotating disc, not shown) configured to fluidly couple tank 12c' with pump unit 16c and the internal pressure vessel. Flow control assembly 92c may include tabs 94c, which are similar to tabs 74 described above, so that flow control assembly 92c may be mounted to wings 58c, 60c on tank 12c and to planar portions 62, 64 of front face 54 using fasteners 70 as described above.

Figure 8:
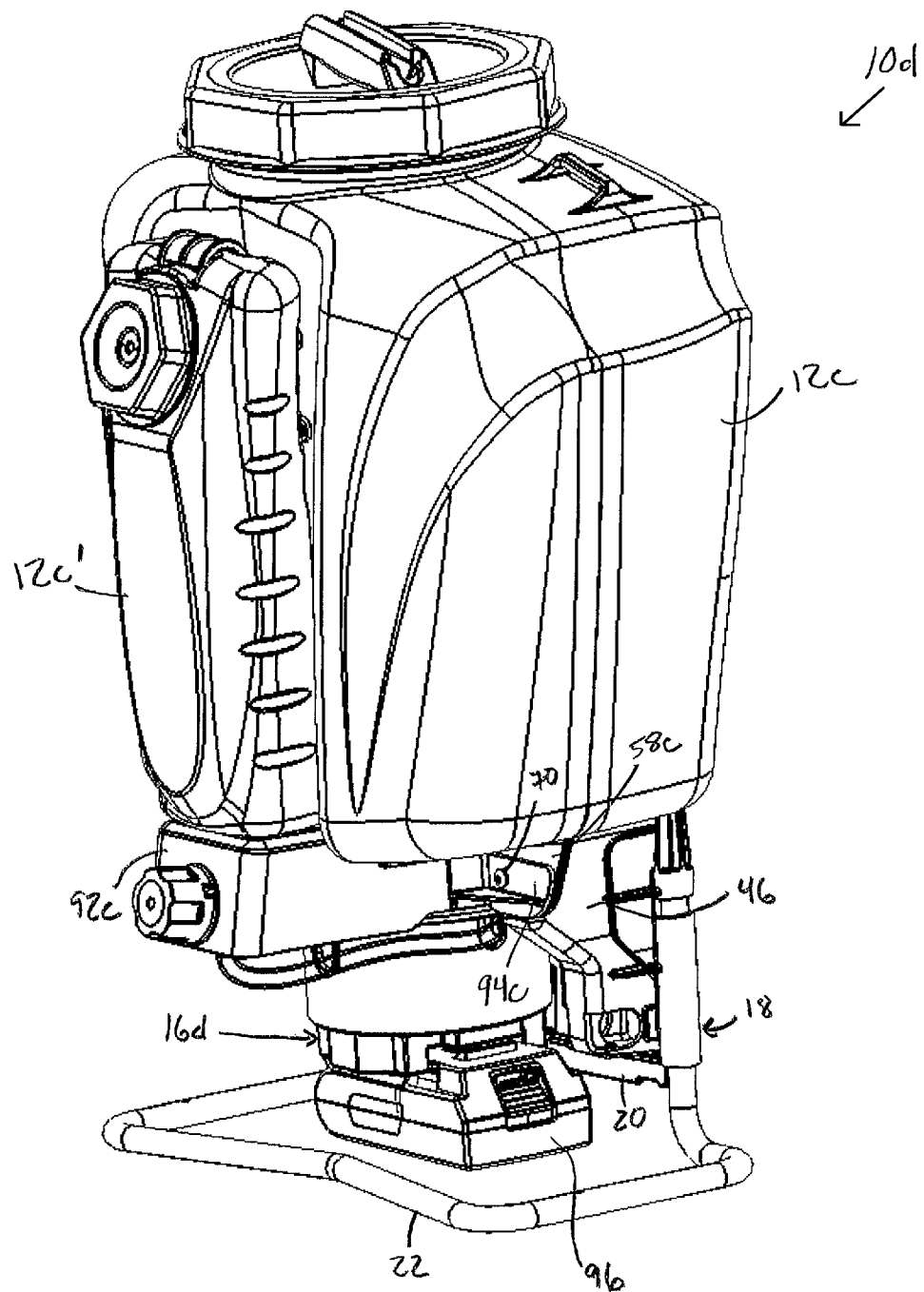
FIG. 8 is a front perspective environmental view of yet another alternative sprayer system using the modular frame for a backpack sprayer shown in FIG. 3.

With reference to FIG. 8, exemplary sprayer system 10d is configured as a dual tank 12c, 12c' unit (plus internal pressure vessel) as sprayer system 10c, but includes a battery powered pump unit 16d rather than manually actuated pump unit 16c. With use of a battery 96, the pump actuation rod and associated bushings are not required. Similar to sprayer system 10c, optional support bracket 72 is replaced with flow control assembly 92c (such as a needle valve or rotating disc, not shown) configured to fluidly couple tank 12c' with pump unit 16d and the internal pressure vessel. As above, flow control assembly 92c may include tabs 94c, which are similar to tabs 74 described above, so that flow control assembly 92c may be mounted to wings 58c, 60c on tank 12c and to planar portions 62, 64 of front face 54 using fasteners 70.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A modular frame for a backpack sprayer system comprising:
   a) a frame plate having a front surface, a back surface and first and second side edges;
   b) a first receiving channel located along said first side edge;
   c) a second receiving channel located along said second side edge;
   d) a support member having a first arm configured to be received within said first receiving channel, a second arm configured to be received within said second receiving channel, and a stand portion extending at an angle relative to said first and second arms;
   e) a mounting member coupled to said front surface of said frame plate and configured to mount a tank and a pump unit thereon, wherein said mounting member includes:
      i) opposing left and right sides;
      ii) a planar top face configured to rest a bottom surface of said tank thereon;
      iii) a front face including a concave portion configured to receive at least a portion of one or both of said tank and said pump unit therein.

2. The modular frame of claim 1 wherein said front face is configured to secure a mounting bracket thereto so as to secure said tank and said pump unit to said mounting member.

3. The modular frame of claim 1 wherein said frame plate and said mounting member are a unitary construction.

4. The modular frame of claim 3 wherein said unitary frame plate and mounting member is formed by injection molding.

5. The modular frame of claim 1 wherein said front surface of said frame plate includes a tank projection above said top face of said mounting member, wherein said tank projection is configured to be matingly received within an indentation formed on a back surface of said tank.

6. The modular frame of claim 1 wherein one or both of said first side and said second side of said mounting member include a respective aperture configured to receive a pump actuation rod therethrough.

* * * * *